United States Patent
Phillips et al.

(10) Patent No.: US 7,103,985 B1
(45) Date of Patent: Sep. 12, 2006

(54) STRINGER CHECK FIXTURE AND METHOD

(75) Inventors: Allen L. Phillips, Shelbyville, KY (US); William T. Johnson, Shelbyville, KY (US); Gary L. Crawford, La Grange, KY (US); Tristan D. Barnett, Shelbyville, KY (US); Lee Jay Scriber, Shelbyville, KY (US); Dennis I. Breidenbach, Louisville, KY (US)

(73) Assignee: Roll Forming Corporation, Shelbyville, KY (US)

( * ) Notice: Subject to any disclaimer, the term of this patent is extended or adjusted under 35 U.S.C. 154(b) by 0 days.

(21) Appl. No.: 11/015,736

(22) Filed: Dec. 17, 2004

(51) Int. Cl.
    *G01B 3/14* (2006.01)
    *G01B 5/20* (2006.01)
(52) U.S. Cl. .......................... 33/562; 33/549
(58) Field of Classification Search ................ 33/562, 33/1 BB, 549, 551, 552
See application file for complete search history.

(56) References Cited

U.S. PATENT DOCUMENTS

| | | | |
|---|---|---|---|
| 1,581,566 A * | 4/1926 | Dunbar | ................... 33/530 |
| 2,625,748 A | 1/1953 | Renaud | |
| 2,977,533 A * | 3/1961 | Savage | ................... 33/551 |
| 3,854,215 A | 12/1974 | Foster | |
| 4,593,476 A * | 6/1986 | Clark et al. | ................... 33/529 |
| 5,208,995 A | 5/1993 | McKendrick | |
| 5,412,877 A | 5/1995 | McKendrick | |
| 6,029,333 A | 2/2000 | Sapienza, IV | |
| 6,034,491 A | 3/2000 | Layton et al. | |
| 6,145,212 A | 11/2000 | Geise et al. | |
| 6,460,264 B1 | 10/2002 | Bos et al. | |
| 6,571,484 B1 | 6/2003 | Hastilow | |

* cited by examiner

Primary Examiner—Christopher W. Fulton
(74) Attorney, Agent, or Firm—Roger S. Dybvig

(57) ABSTRACT

An aircraft frame stringer is checked against designed specifications using a set of templates with stringer-engaging, upwardly-facing surfaces that match the designed contours of sections of the stringer at different locations along the length of the stringer. The templates are removably supported in mutually aligned and spaced relationship on a base assembly. The stringer is placed on the templates and measurements are made to determine if the stringer contours at the different locations match, within acceptable tolerance limits, the template contours at those locations. A computer model is used to determine the contours of the sections of the stringer at the desired locations thereon and to control the operation of a CNC machine for machining the templates.

15 Claims, 5 Drawing Sheets

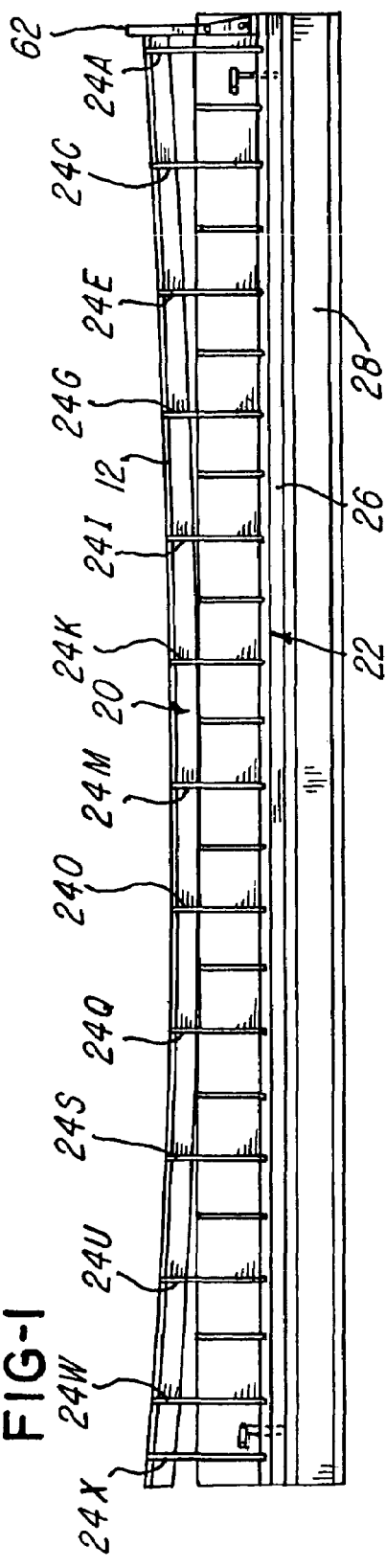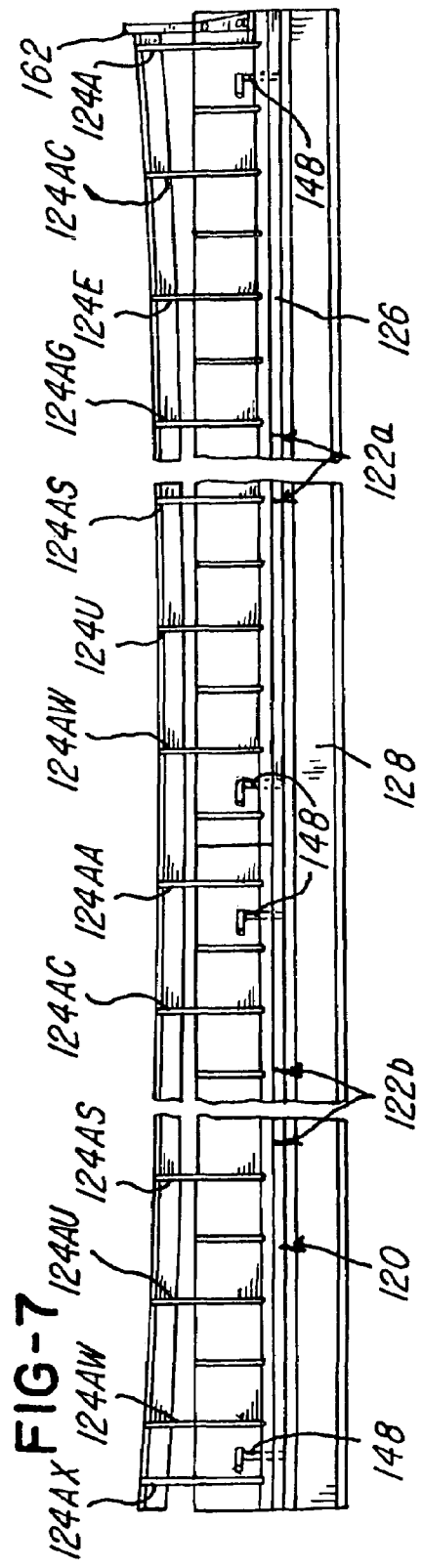

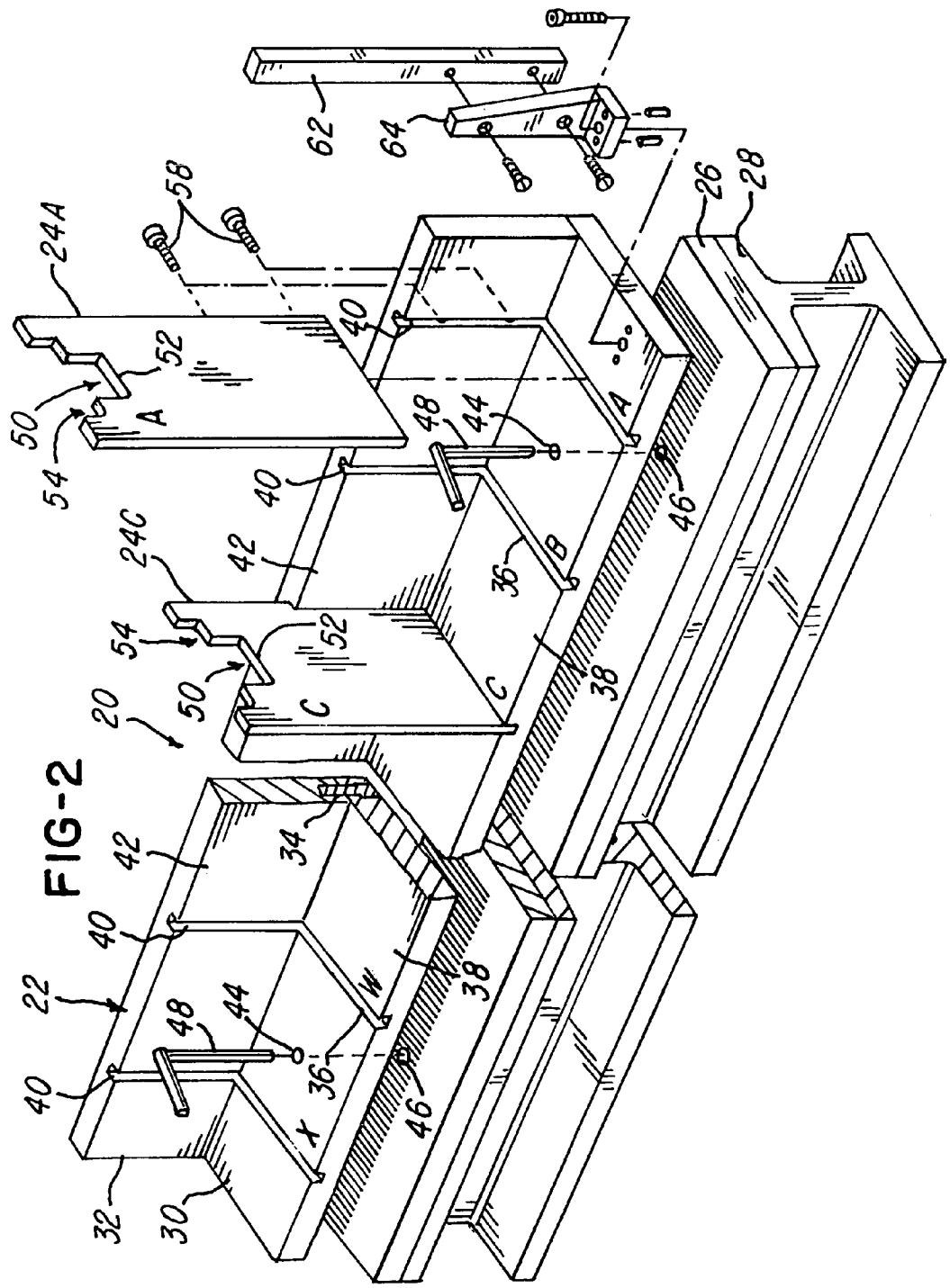

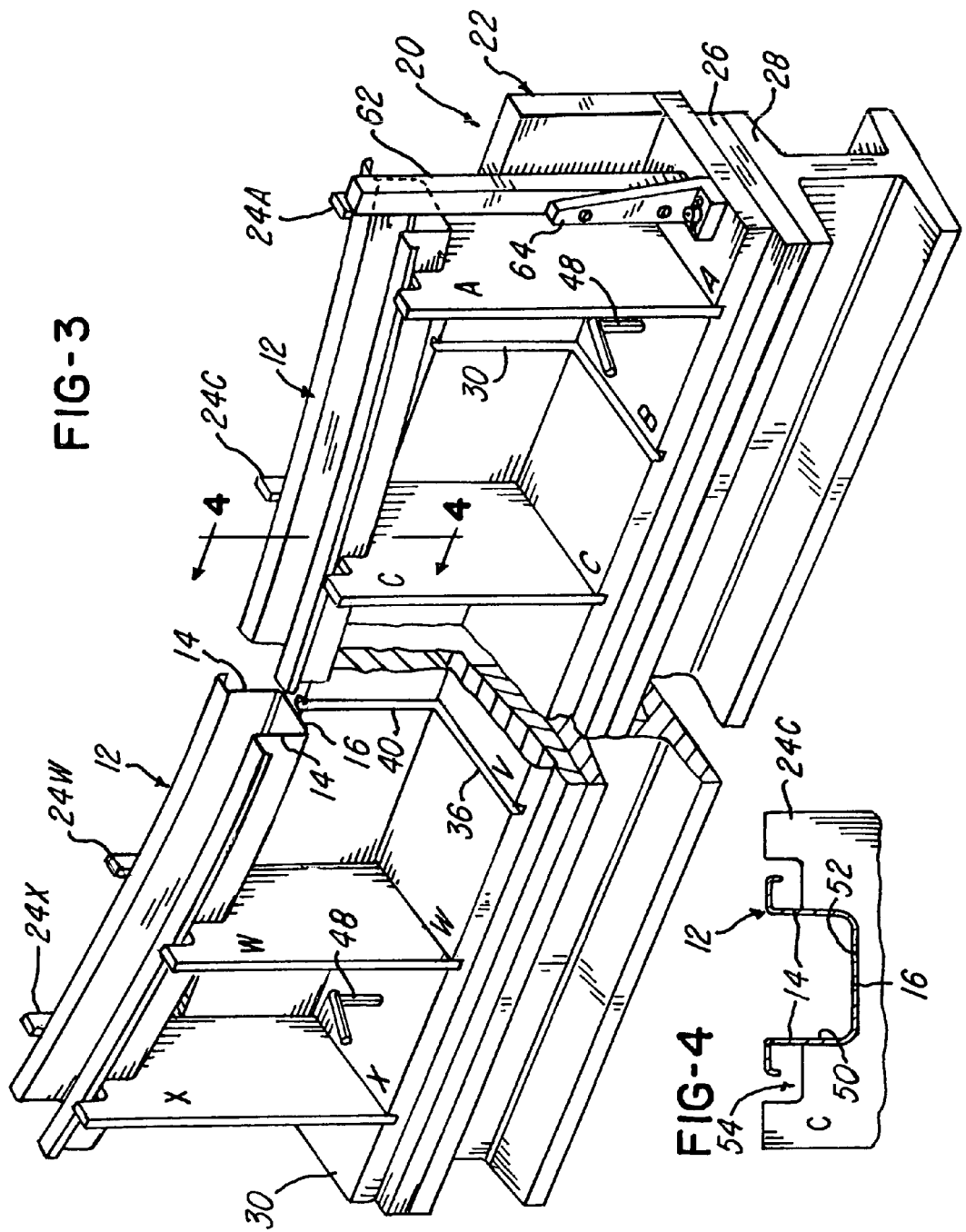

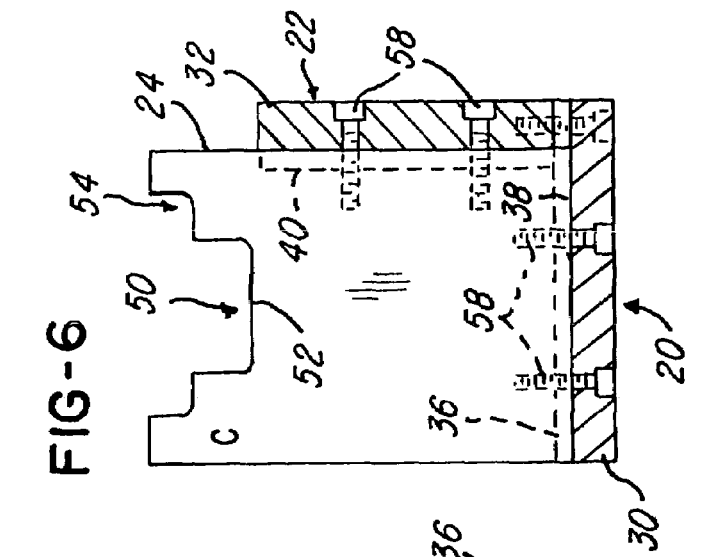
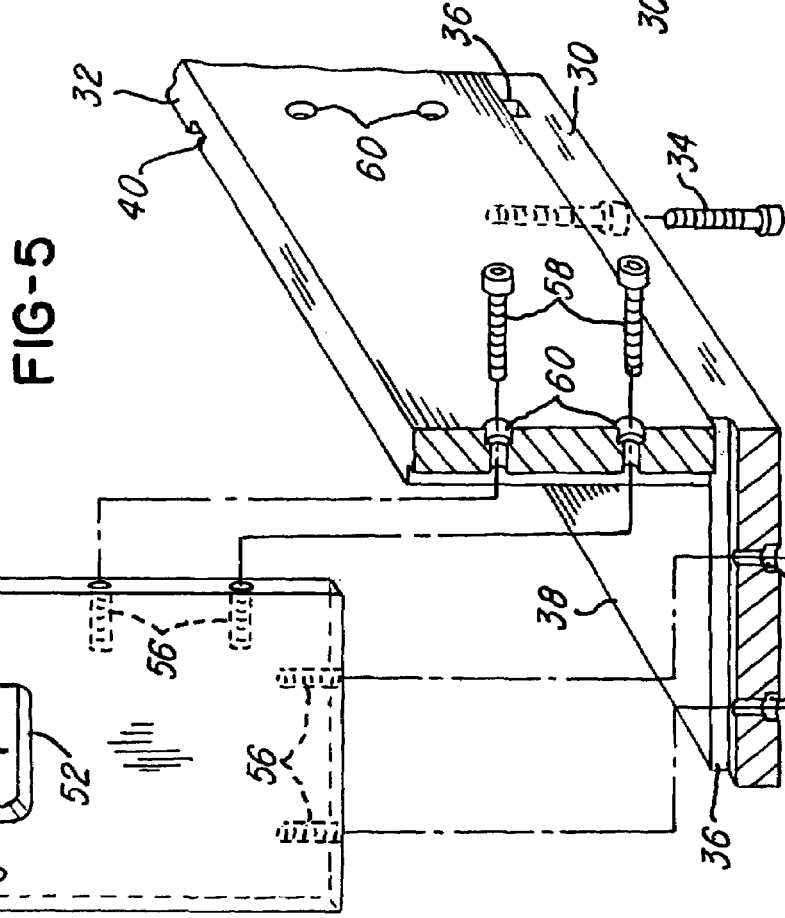

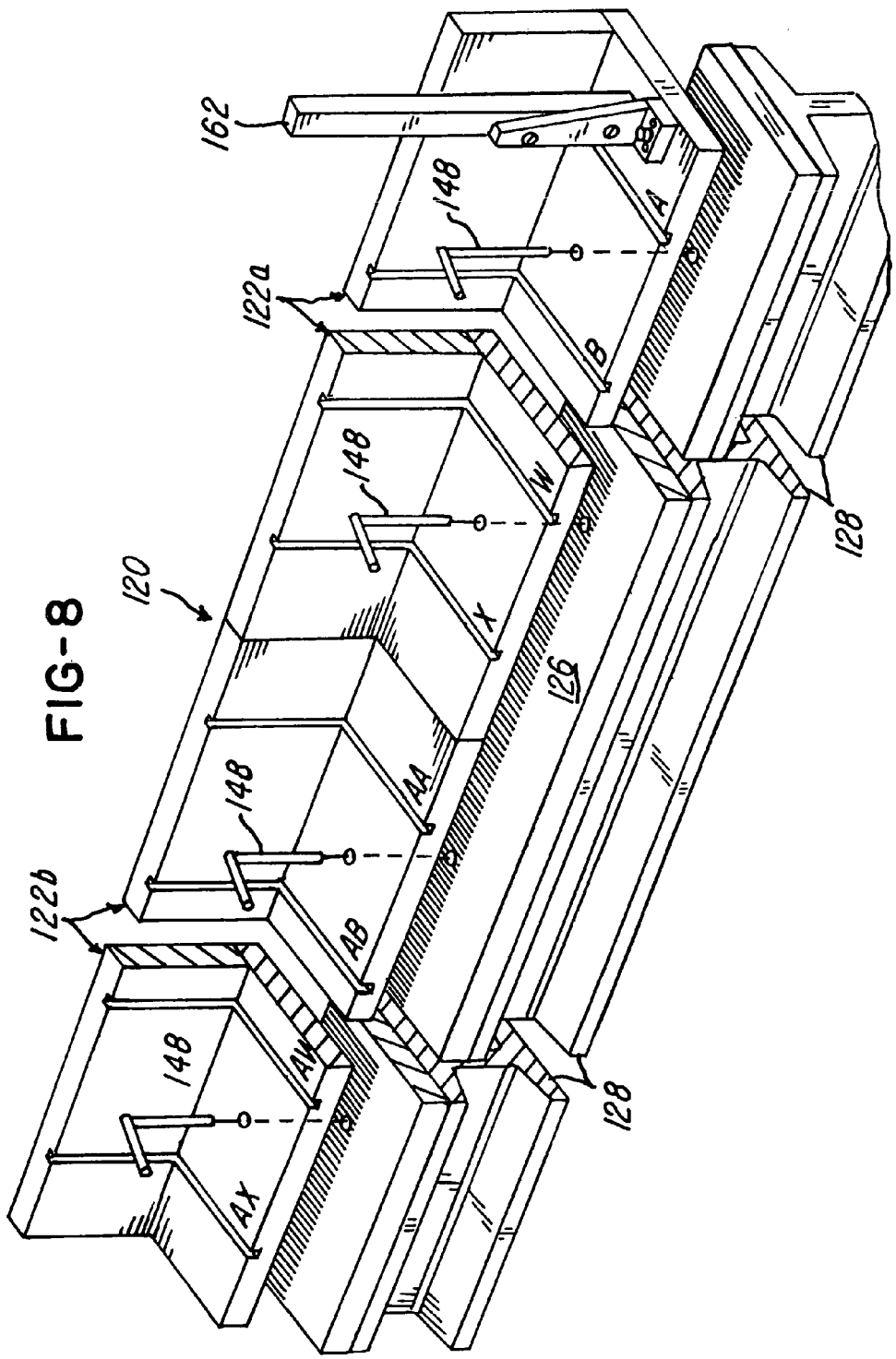

STRINGER CHECK FIXTURE AND METHOD

FIELD OF THE INVENTION

This invention relates to a check fixture and method for checking the conformity of aircraft frame stringers to designed specifications.

BACKGROUND OF THE INVENTION

The frame of an aircraft includes longitudinally-extending stringers to which body panels are riveted at locations which match the inside mold line (IML) of the body of the aircraft. To ensure that the contour of a stringer matches, within tolerances, the IML of an aircraft body, aircraft manufacturers typically require that the stringers be checked for compliance with the designed IML at several locations or stations along the length of the stringer. Prior methods for checking if a stringer is within specifications have not been entirely satisfactory, being highly expensive and/or time-consuming.

SUMMARY OF THE INVENTION

A check fixture in accordance with this invention comprises a base assembly on which are mounted a row of mutually spaced, parallel, vertically-extending templates designed to mate with and support a stringer to be checked. The base assembly is designed to enable the templates to be positioned at equally-spaced stations to meet customer requirements for checking the stringers. Each template is manufactured to include a machined surface along an upper edge thereof that matches the shape of a corresponding transverse section or "slice" generated from a computer model of the stringer. Each slice taken from the computer file has substantially the same thickness as a corresponding template.

The base assembly may also be designed to enable templates to be located to support and check a stringer at other stations along the length of the base assembly. Airframe manufacturers in the United States of America typically require a stringer to be checked at 12-inch intervals along the entire length of the stringer. For such purpose, a base assembly in accordance with this invention is constructed to support an array of templates positioned at stations which are mutually spaced on 12-inch centers. In addition, to accommodate short stringers or the front ends of stringers, a base assembly constructed to support stringers every 12 inches along the length of the base assembly may also be constructed to support stringers midway between each of the 12-inch centers. Accordingly, for typical present-day requirements of U.S. airframe manufacturers, the base assembly of this invention may be constructed to be able to support templates at six inch intervals along its entire length. Of course, the base assembly could be provided with other locations for templates as may be needed to meet different stringer-checking requirements.

A stringer is checked for compliance with the customer's standard by simply placing the stringer onto the templates in proper registry and determining if the stringer matches margins of the notches in the templates within an acceptable tolerance.

Proper registry between the check fixture of this invention and the stringer to be checked is obtained by determining the distance from the aft end of the stringer to the designed location of the first, rearmost, template station and inserting that part of the stringer on the first template. To accomplish the proper registry of the templates and the stringer, the check fixture may be provided with a rear or bank end stop against which the rear or bank end of the stringer is abutted and the templates are stationed at predetermined spacings from the bank end stop.

The base assembly comprises an elongate base plate supported in a horizontal orientation on a table and a vertical back plate mounted on the rear edge of the base plate. Plural, mutually parallel, horizontally-extending template-support slots are located along the upper surface of the base plate, extending transversely to the longitudinal axis of the base plate. The template-support slots may be on equally spaced centers. The back plate has a like number of vertical slots which are open to corresponding base plate-support slots. Each template is inserted into one of the base plate slots and into the corresponding vertical slot so that the template is securely held in a vertical orientation. Means such as screws or bolts may be used to fixedly locate the templates on the base assembly.

A check fixture in accordance with this invention has several potential gauge stations, each gauge station comprising a template supported in one of the template-support slots. For ease of assembly and disassembly of the check fixture, each potential gauge station may be identified on the base assembly by a suitable numerical or alphabetical progressive set of indicia such as A, B, C, or 1, 2, 3, and so forth, with each template marked with the same type of indicia to identify the station at which the template is to be located. The check fixture can be converted from checking a set of stringers of one design to checking a set of stringers of a different design by simply removing the first set of templates used to check the first set of stringers and replacing them by the templates needed for checking the second set of stringers. Accordingly, the templates for each set of stringer can be retained for use at a later date. Reassembly into the base assembly is readily accomplished because of the obvious correlation between the indicia on the templates and the indicia identifying the slots on the base assembly.

Other features and advantages of the invention will become apparent from the following description and the drawings.

BRIEF DESCRIPTION OF THE DRAWINGS

FIG. 1 is a front elevational view of a stringer check fixture made in accordance with this invention and a stringer in position to be checked in accordance with a method in accordance with this invention.

FIG. 2 is a partly exploded, fragmentary isometric view of the check fixture of FIG. 1, as viewed from above, the front, and the right end of the check fixture.

FIG. 3 is a fragmentary isometric view, partly in cross section, of the check fixture of FIG. 1 and a stringer in position to be checked, as viewed from above, the front, and the right end of the check fixture.

FIG. 4 is a fragmentary end view of a template of FIG. 1 and a transverse cross-sectional view of the stringer taken along lines 4—4 of FIG. 3.

FIG. 5 is a partly exploded, fragmentary isometric view, partly in cross section, of a portion of the check fixture of FIG. 1, as viewed from above, behind and the right end of the check fixture.

FIG. 6 is a transverse cross-sectional view of the parts of the check fixture shown in FIG. 5 but assembled together, with a template shown in end elevation.

FIG. 7 is a fragmentary front elevational view of a second embodiment of a stringer check fixture made in accordance with this invention and a stringer in position to be checked in accordance with a method in accordance with this invention.

FIG. 8 is a partly exploded, fragmentary isometric view of the check fixture of FIG. 7, as viewed from above, the front, and the right end of the check fixture.

DETAILED DESCRIPTION

Referring first to FIGS. 3 and 4, a typical stringer 12 is illustrated in the form of a hat section having side walls 14 and a skin-engaging surface 16, referred to herein as "base wall," which is intended to be riveted to the skin of an aircraft body. Those familiar with the art are aware that stringers are often formed to follow paths that change along the length of the stringer in all three (x, y, and z) axes. The method and the apparatus of this invention are used to check the conformance of the base wall 16 along the length of the stringer 12 against design specifications. Before this invention is put to use to check a stringer 12, the overall height and width dimensions of the stringer 12 have been determined to be within design tolerances by precedent processing steps.

A first embodiment of a check fixture, designated 20, in accordance with this invention is illustrated in FIGS. 1 through 6. The check fixture 20 comprises a base assembly 22 and plural templates 24. Individual templates 24 are further identified by indicia comprising the letters "A", "C", "E," and so forth, beginning with the right or aft end of the check fixture 20. Each of these letters correspond to a possible stringer station.

The base assembly 22 rests on a flat, horizontal support plate 26 which in turn rests on the top surface of a horizontally oriented, calibrated I-beam 28.

With reference to FIGS. 2, 5 and 6, the base assembly 22 comprises a flat, horizontal base plate 30, and a flat, vertical back plate 32 supported on top of the back edge of the base plate 30 and affixed thereto by plural bolts 34.

Plural, mutually parallel, horizontally and transversely-extending template-support slots or grooves 36 are recessed in the top surface 38 of the base plate 30. Similarly, plural, mutually parallel, vertically and transversely-extending, template-retaining, slots or grooves 40 are recessed in the front surface 42 of the back plate 32. Each vertical template-retaining slot 40 is equidistant from the right or aft end of the back plate 32 to a corresponding template-support slot 36. The aft ends of both plates 30 and 32 are coplanar so that the assembled base assembly 22 has a series of aligned horizontal template support slots 36 and vertical template-retaining slots 40. As further described below, each pair of aligned slots 36 and 40 are available to support a template 24 in a vertical orientation.

A pair of through bores 44 may extend vertically through the base plate 30 adjacent the opposite ends thereof which are moved into alignment with respective bores 46 in the support plate 26. Key pins 48 can be extended into the mutually aligned bores 44 and 46 to retain the base plate 30 and thereby the entire base assembly 22 in a fixed position on the support plate 26, although that is not necessary in the embodiment of FIGS. 1 through 6.

With reference to FIGS. 2 through 6, each template 24 in accordance with this invention comprises a plate-like body having an upper surface shaped to receive a section of a stringer 12 including a recessed, stringer-receiving pocket 50 having an upwardly-facing bottom wall 52 shaped to conform to the designed shape of the stringer base wall 16 at a particular location along the base assembly 22. Pocket 50 is located centrally of a larger pocket 54 that accommodates the upper portion of the stringer 12 as shown in FIGS. 3 and 4.

Each of the templates 24 may have drilled and tapped holes 56 in its bottom and rear side edges to permit the templates 24 to be secured to both base assembly plates 30 and 32 by bolts 58 which extend through countersunk holes 60 in the plates 30 and 32.

To provide for accurately positioning a stringer 12 along the length of the check fixture 20, an aft end locator or stop member 62 is supported by a mounting bracket 64 at the aft end of the base plate 30, such that it will be aligned with the stringer-receiving pocket 50 in the first, aftmost, template 24A.

A manner in which the shapes and orientations of the pockets 50, and particularly their bottom walls 52, are developed will now be described. The digital data for a stringer is obtained from the airframe designer or manufacturer in a 3-D model format. By computer, the stringer digital data is used to simulate a stringer in the "catch water" orientation, which is the same as the orientation shown in FIGS. 3 and 4. It may so orient the stringer (digitally) that its ends are equidistant from a common horizontal plane in space. Then a simulated "slice" having a width equal to the width of a template 24 is taken through the stringer at each template position or "stringer station line" and the digital data representing the outer perimeter of that slice is machined into a template 24, taking into account allowable tolerances, by a CNC machine (not shown) to form the pocket 50 of the particular template 24 to be used at that stringer station line. All of the templates 24 for a particular stringer design are made in the same way. Each template may be inspected by a CMM to ensure that its cross-sectional profile matches the digital data for the stringer station line at which the template is to be located.

To check conformance of stringers of a given design, the templates 24 for that design are mounted in the appropriate base assembly slots 36 and 40, the aft end of a stringer is abutted against the aft end stop member 62, and the rest of the stringer lowered onto the template pockets 50. The conformity or lack of conformity of the stringer being checked is then determined by use of a calibrated pin gauge (not shown) for checking the size of the gap, if any, between the base wall of the stringer and the mating surface of the template. Airframe manufacturers may permit use of a weight, such as a calibrated sand or bean bag, to bias a section of a stringer into conformity with a designed profile. Such bias can be obtained using the check fixture 20 of this invention by the simple expedient of placing the calibrated sand or bean bag on top of the section of a stringer in a template pocket 50.

Although different requirements may be required, a gap of 0.030 inches between the base wall 16 of the stringer and the bottom wall of the template pocket 50 is usually considered acceptable. If the detected gap exceeds 0.030 inch (or any other tolerance permitted by the airframe manufacturer), the stringer profile would require correction.

It will be recognized that the templates 24 could readily be removed and replaced by other templates for stringers having different configurations. A set of templates for checking a stringers of one design can be marked with an appropriate part number and, after removal from the base assembly 22, stored for future use should the need arise for checking the same stringers at a later date.

For ease of assembly, each of the templates is marked with indicia representative of stringer stations at which cooperating template support and retaining slots 36 and 40 are located, and the base assembly 20 has corresponding indicia so that the station at which a particular template is to be located is readily and accurately identifiable. For example, the station closest to the aft end of the base assembly may be marked as station "A," and succeeding stations marked "B", "C" and so forth, as shown in FIGS. 2 and 3. If, for example, templates are to be mounted at every other station, they would correspondingly be marked "A", "C", etc., as also shown in FIGS. 2 and 3.

A specific example of a check template 20 in accordance with this invention includes a 12 foot long base assembly 22, thus having a base plate 30 which is 12 feet long, and a back plate 32 which is also 12 feet long. The several possible stations formed by the cooperating pairs of slots 36 and 40 are mutually spaced on six inch centers, the first pair of slots at station "A" are three inches from the aft end of the base assembly, and 1.25" from the forward face of the aft end stop member 62. Each of the templates is 0.25" thick and the template-supporting and retaining slots 36 and 40 essentially the same width but with a tolerance to permit the bottom and rear edges of the templates 24 to be received therein. The slots 36 and 40 at the forward most station are located three inches from the forward end of the base assembly 22. Of course, dimensions other than those mentioned above may apply.

The specific check fixture 20 described above is used to meet a typical requirement for checking stringer profiles every 12 inches. The stations midway between 12 the alternate stations separated by 12 inches are useful for those occasions in which the length of a stringer is such that an undesirably long unsupported length of the stringer would extend past one forward template 24 without reaching the next forward template 24. Such a situation is avoided in the setup shown in FIG. 1 in which there are two templates 24W and 24X that are only six inches apart to provide support for the forward end of the stringer 12. Without the template 24X in place, the forward end of the stringer 12 would extend past the stringer 24X by over six inches.

FIGS. 7 and 8 show another embodiment of a check fixture, designate 120, in accordance with this invention. The fixture 120 is actually two fixtures, having base assemblies 122a and 122b, placed end-to-end on a support plate 126 that rests on a calibrated I-beam 128, and maintained in their end-to-end relationship by key pins 148. Base assembly 122a may be essentially identical to the base assembly 22 of the single fixture 20 shown in FIG. 1, and has an aft end stop 162. Base assembly 122b can be nearly identical to the base assembly 22, but is not provided with an aft end stop. Obviously, the fixture 120 of FIGS. 7 and 8 can be used for longer stringers, such as the fixture 116 shown in FIG. 1. In FIG. 7, the several templates 124 mounted on the base assembly 122a are identified by letters A, B, C, and so forth, while those mounted on the base assembly 122b are identified by letters AA, AB, AC, and so forth. The same indicia may be marked on the templates 124 and on the base assemblies 122a and 122b for reasons previously discussed.

As is deemed evident, within the purview of this invention, other embodiments of a check fixture could have additional base assemblies aligned with the two base assemblies 122a and 122b of FIGS. 7 and 8, with additional templates 22 used therewith.

The base assembly plates, such as plates 30 and 32, and the templates 24 forming a check fixture in accordance with this invention would typically be made from metal, such as aluminum, but other construction materials may be used.

We claim:

1. A method for checking the conformity of aircraft frame stringers to designed specifications comprising the steps of:
   providing a set of templates with contoured, stringer-engaging upper surfaces that match the designed contours of sections of a stringer at different stringer station lines along the length of the stringer;
   supporting the templates in mutually aligned and spaced relationship in template locations that correspond to said different lines along the length of the stringer;
   placing a stringer on the contoured upper surfaces of the templates; and
   measuring to determine if the stringer contours at the different template locations match, within acceptable tolerance limits, the template contours at those locations.

2. The method of claim 1 wherein said set of templates are provided with contoured, stringer-engaging upper surfaces that match the designed contours of sections of the stringer at the stringer station lines by using stringer digital data to simulate the stringer and taking a simulated slice through the simulated stringer at each stringer station line at which the stringer is to be checked.

3. The method of claim 2 wherein each of said simulated slices has the same width as the width of the templates used to check said slices.

4. The method of claim 3 wherein each of said templates has the same width as each of the others of said templates.

5. The method of claim 1 further comprising providing a base plate for supporting said templates, including plural, upwardly-open, equally-spaced, mutually-parallel, template-supporting slots along its length, and placing said templates in selected ones of said slots.

6. The method of claim 5 further comprising supporting said base plate on a calibrated I-beam while checking said stringer.

7. The method of claim 5 further comprising supporting a second base plate on said calibrated I-beam in a releasably fixed, end-to-end coaxial relationship with said first mentioned base plate to enable longer stringers to be checked than could be checked using only said first-mentioned base plate.

8. The method of claim 7 wherein said base plates are releasably held in fixed end-to-end relationship by key pins.

9. The method of claim 5 further comprising removing said set of templates and replacing them by a second set of templates for measuring a stringer having a different design.

10. The method of claim 1 wherein said measuring step is performed using a calibrated pin gauge to measure the size of the gap, if any, between mutually confronting surfaces of the templates and the stringer.

11. The method of claim 1 further comprising maintaining an end of said stringer engaged against an end stop aligned with said templates to ensure that the stringer station lines are properly aligned with said templates during said measuring step.

12. A check fixture for checking an aircraft stringer against a computer generated standard comprising:
   a base plate;
   a stop surface; and
   plural, parallel, and axially aligned templates mounted on said base plate, said templates comprising plates of uniform thickness, each of said templates having an upwardly-facing gauge surface that conforms to a computer generated shape of a slice of a surface of the stringer at a specific distance from an end of the stringer, said templates being fixed in locations at spacings from said stop surface equal to the spacings of stringer station lines from an end of said stringer.

13. A check fixture for checking an aircraft stringer against a computer generated standard comprising a horizontal base plate having a top surface, a front edge and a back edge; a vertical back plate supported on and affixed to the back edge of the base plate; said base plate having plural, mutually parallel, horizontally and transversely-extending template-support slots recessed in the top surface thereof; plural, mutually parallel, vertically and transversely-extending, template-retaining slots recessed in the front surface, each vertical template-retaining slot being aligned with a corresponding template-support slot in said base plate; plural vertical templates having edges received in respective different ones of said aligned support slots and retaining slots; each of said templates comprising a plate-like body having an upper surface shaped to receive a section of a stringer including a recessed, stringer-receiving pocket having an upwardly-facing bottom wall shaped to conform to the designed shape of the stringer base wall at a particular location along the base assembly.

14. The check fixture of claim 13 wherein each of said templates has drilled and tapped holes in both its bottom and rear edges to permit the templates to be bolted to both said base plate and said back plate.

15. The check fixture of claim 14 wherein said slots have indicia indicative of their respective positions on said base plate and said templates are provided with indicia corresponding to the positions in which they are to be mounted on the base plate so that the templates may be removed from said support plate and later reassembled onto said support plate.

* * * * *